Patented Aug. 2, 1932

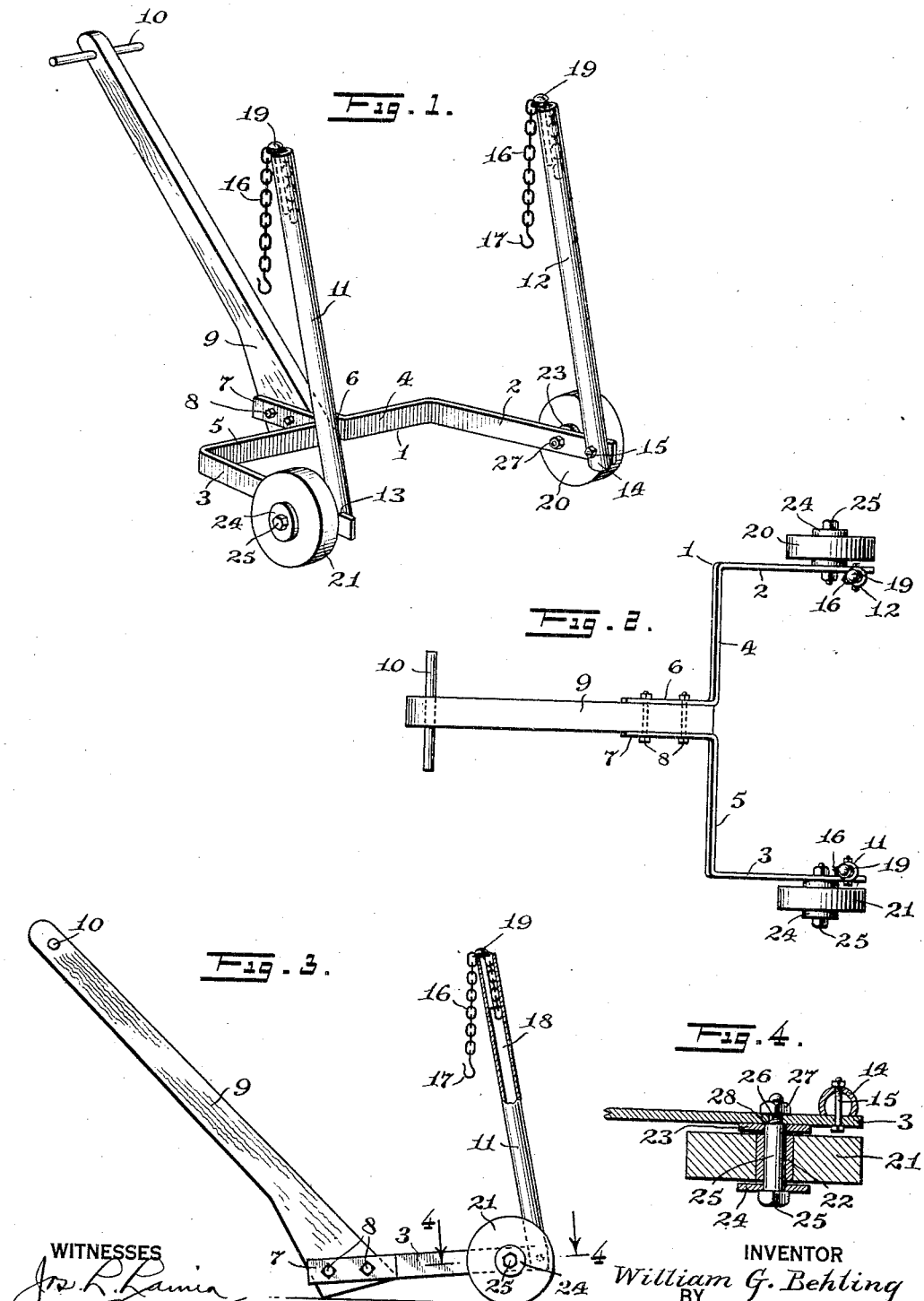

1,870,163

UNITED STATES PATENT OFFICE

WILLIAM G. BEHLING, OF NORTH BERGEN, NEW JERSEY

LIFT CART

Application filed April 1, 1931. Serial No. 526,990.

This invention relates to lift carts for ash cans and in fact cans for any desired purpose, the object being to provide an improved structure wherein the cart may be moved up to a can, connected thereto and then tilt to a desired position which will raise the can, whereupon the can may be transported from one place to another with comparative ease.

Another object of the invention is to provide an improved lift cart for ash cans and the like wherein the ash can may be readily moved up a staircase without spilling the contents and with a minimum effort.

A still further object of the invention is to provide a lift cart for cans wherein cans carrying either liquid or solid matter may be raised and transported without spilling the contents, the structure being such as to maintain the can substantially in vertical position while the cart is passing over a horizontal surface or while it is passing up an incline.

In the accompanying drawing, 1 is a perspective view of a lift cart disclosing an embodiment of the invention.

Figure 2 is a top plan view of the cart shown in Figure 1.

Figure 3 is a side view of the cart shown in Figure 1, part of one of the uprights being broken away for illustrating the construction thereof.

Figure 4 is an enlarged fragmentary sectional view through Figure 3 on line 4—4.

Referring to the accompanying drawing by numeral, 1 indicates a frame which consists of side bars 2 and 3 having end sections 4 and 5 merging into the clamps 6 and 7 which are clamped by the bolts 8 at the bottom part of the handle 9. The frame 1 is preferably made of metal, while handle 9 is preferably made from wood and provided with a suitable rod 10 acting as a pair of grips. Arranged adjacent the front of the bars 2 and 3 are uprights 11 and 12. As these uprights are identical, the description of one will apply to both. As illustrated particularly in Figures 1, 3 and 4, upright 11 is formed from tubular stock and is cut away at the lower end to form a shoulder 13 which rests against the top bar 11 while the depending portion 14 is clamped firmly against the bar 3 by a bolt 15. In this way, the upright 11 is held rigidly in place and therefore it readily accommodates the chain 16 and also acts to support the weight of the can when connected with the chain 16. Chain 16 is provided with a hook 17 and is arranged so that a portion thereof will be in the bore 18 of the upright, said portion being locked by a pin 19 which is merely forced in manually. This arrangement is sufficient to prevent a pull on hooks 17 from disconnecting the chain from the upright.

When the device is in use, it is moved over to an ash can or other can and tilted forward until the hooks 17 on the respective uprights are engaged with the handles of the can. If the hooks are not properly positioned, pins 19 may be removed and the pins adjusted accordingly. After this has been done, the handle 9 is swung downwardly until the frame 1 is in a horizontal position or until the can has been lifted to the desired extent whereupon it will be swung between the uprights 11 and 12 and may be readily transported from place to place. Connected with the frame 1 are wheels 20 and 21. As these wheels are identical in structure, a description of one will apply to both. As illustrated in Figure 4, wheel 21 is solid throughout and is preferably provided with a metal bushing 22 and washers 23 and 24, washer 23 acting as a spacer for holding the wheel away from bar 3. A journal bolt 25 extends through the washer and sleeve 22, said bolt having a restricted end section 26 to receive the nut 27 whereby shoulder 28 is presented, said shoulder being clamped rigidly against bar 3 when nut 27 is tightened. In this way, a rigid stub shaft is provided for the wheel and the wheel, as indicated in the drawing, is located near the front of the frame 1 so that the ash can or other container carried by the device will be almost directly on the wheels and consequently it will require but little power to manipulate the handle 9.

During this action, the frame 1 will be substantially parallel with the angle of the steps while the can will be swinging freely on the chains 16 and consequently will remain in a substantially vertical position so that none of the contents will be spilled.

I claim:

1. A lift cart provided with a frame, traction wheels for supporting the frame, a handle connected to the frame at the opposite side to the supporting wheels, an upright adjacent each wheel and flexible means carried by the upper end of the uprights and depending therefrom, each of said flexible means having a member at its lower end adapted to engage the handle of an ash can or other receptacle.

2. A lift cart including a frame provided with a handle and a pair of traction wheels, a pair of tubular spaced uprights, a chain for each upright, part of the chain normally extending into the upright and the remaining part normally depending from the upper end of the uprights but exteriorly thereof, and means for locking the chain in different adjusted positions in respect to the upright, said chains being positioned to have the lower ends connected to a weight to be carried.

3. In a lifting cart, a pair of tubular uprights open at the upper end, a chain for each upright, each of said chains having a hook at one end and having a portion in the upright and extending downwardly into the upright, and a removable pin normally mounted in the upper end of the upright for clamping the chain in position.

4. In a lifting cart for lifting cans having handles, a substantially U-shaped frame comprising two substantially L-shaped flat bars, each bar having a rearwardly extending handle receiving projection, a handle having an enlarged end fitting between said projections, fastening means extending through said projections and said enlarged end for connecting said L-shaped bars together to produce said U-shaped frame and for securing said handle to said frame, a pair of traction wheels carried by said U-shaped frame, a hollow upright secured at one end to said frame near each of said traction wheels and can engaging chains adjustably connected to the upper ends of said uprights, each of said chains having means adapted to interlock with the handles of the can to be lifted.

WILLIAM G. BEHLING.